Patented May 15, 1928.

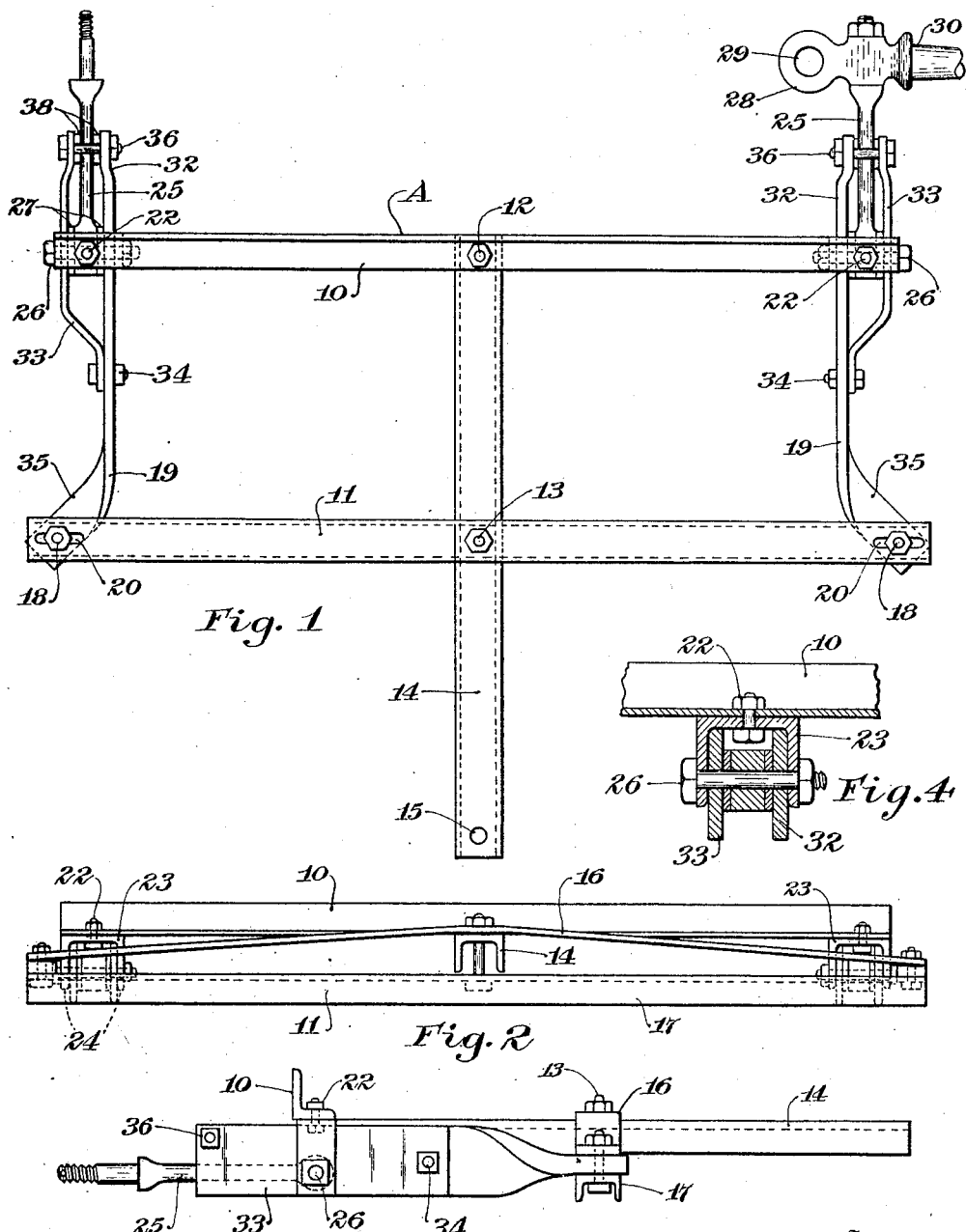

1,669,452

UNITED STATES PATENT OFFICE.

OSCAR BREKKE, OF MINNEOTA, MINNESOTA.

TRAILER GUIDE.

Application filed March 7, 1927. Serial No. 173,284.

My invention relates to trailer guides, wherein it is adapted to provide a means of guiding a four wheel trailer in a manner to minimize the swaying of the same and in fact, overcomes undesirable swaying of a trailer in back of another vehicle which is pulling the same.

A feature of my invention resides in means for connecting directly to the hub of the steering wheels of the trailer to provide rigidity and to eliminate lost motion in the connection of the hitch with the vehicle pulling the trailer, yet permitting the steering wheels to function readily in a manner to properly steer the vehicle.

Is is also a feature of my invention to provide a frame means which is adjustable at the joints in a manner so as to adjust the frame for the particular trailer, with its connecting arms extending directly from the hub of the steering wheels and which provides the adjustment of the frame with the arm so that practically no play is apparent between the connecting parts and thus I provide a means of extending to the tongue which pulls the trailer, a connection which overcomes the lost motion ordinarily apparent in trailer hitches heretofore in use in so far as I know. This is an important feature of my invention as it is very undesirable to have a trailer hitch wherein the hitch permits and causes the swaying of the trailer behind the vehicle which is pulling the same, making it dangerous for passing motors where the trailer is swaying from side to side. It is also true that my trailer guide provides a means of steering the trailer much more readily and thus taking less power from the pulling vehicle and reducing the strain both on the pulling vehicle and trailer which is quite apparent, as I have stated that practically all of the side sway is overcome in the trailer where my connecting hitch is used.

These features, together with other objects and details of my invention will be more fully and clearly set forth in the specification and claims, together with the particular means which I employ in carrying out my invention.

In the drawings forming part of the specification:

Figure 1 is a plan view of my trailer hitch.

Figure 2 is a front view of the same.

Figure 3 is a side view of the same.

Figure 4 is a section on the line 4—4 of Figure 1.

My trailer guide A is formed with the framework having parallelly extending members 10 and 11 to which is pivotally connected at 12 and 13 the pulling tongue 14 which is adapted to be connected to the vehicle through the opening 15 in the outer free end of the same in any suitable manner.

The pulling tongue 14 is of a channel shape as illustrated in Figure 2 so as to provide a light weight, strong, rigid connecting member for pulling the trailer and to operate the members 10 and 11 of the trailer guide A. The part 10 is an angle iron member which extends across the back portion of the trailer guide and hitch A, while the front member 11 is formed by the upper strap member 16 and the lower channel shaped member 17. The pivot point or bolt 13 provides the connection of the tongue 14 of the front cross member 11 which is made up of the strap member 16 and the channel member 17. These members are bowed apart to extend on either side of the tongue 14 as illustrated in Figure 2 at the center portion, while the ends are drawn together and are adapted to be connected by the bolts 18 to the pulling arm 19 which extends along each side of the frame of the guide A.

I provide a slot 20 in the ends of the members forming the cross member 11 which permits the bolt 18 to adjustably position the front end of the pulling arm 19 to the cross member 11.

The rear transverse member 10 which is in the form of an angle iron, is adapted to be connected by the bolts 22 to the U-shaped coupling 23 so as to pivotally connect the ends of the cross member 10 to these U-shaped couplings 23 on each end of the member.

The U-shaped coupler member 23 has its depending sides 24 adapted to engage on either side of the spindle arm 25 and is adapted to be connected to the same by the bolt 26, suitable washers or shim members 27 being placed between the spindle arm and the depending ends 24 of the connector 23 to take up any slack between the connector 23 and the front end of the spindle arm 25.

The spindle arm 25 instead of being connected to a cross arm or connector as is usually done in a trailer to connect the axles of the two front wheels together, is turned into a vertical position and is adapted to be pivotally connected by the bolts 26 to the trailer guide hitch A, to pull the trailer directly from the spindle bolt 25 which also steer the trailer. In so far as I know, this is an entirely new principle for guiding and pulling trailers and is an important feature in my invention.

The spindle arms 25 are adapted to be connected in a suitable manner to the axle 28 of the front or steering wheels of the trailer to which my guide is attached. I have not illustrated the trailer steering wheels or any portion of the trailer as the trailer may be of any common, ordinary, well known construction having suitable axle members 28 for the steering wheels of the same which are pivoted through the opening 29 in the axle, while the axle is carried by the end 30 of the same.

I provide an extending guide end 32 on the rear end of the pulling arms 19. This end 32 is adapted to be bent slightly inward toward the body of the spindle arm 25. On the outer side of the pulling arms 19 I provide a connecting member 33 which is rigidly connected by the bolt 34 to the pulling arm. The front end of the pulling arm 19 is twisted to extend with the flat portion 35 between the ends of the cross member 11 which is held by the bolts 18 as hereinbefore described.

The connecting member 33 forms the brace on the outer side of the arm 19 and is adapted to be connected with the inner end 32 of the arm 19 by means of the bolt 36 which extends through the top portion of the portion 32 and the member 33. The lower portion of the end 32 and the member 33 extend down and on each side of the spindle arm 25. Shim members 38 are adapted to be placed extending from the bolt 36 to engage on either side of the spindle arm 25. In this manner the adjustment between the sides of the end 32 and the member 33 is adjusted in relation to the spindle arm 25 so that no play will be apparent between the member 33 and the end 32.

Thus the entire trailer guide A is pivoted on the bolts 26 in a manner so as to raise up and down in relation to the spindle arms 25 and the sides of the spindle arm engaged by the ends of the pulling arm and brace member 33 so as to prevent any play or movement between these parts.

The end 32 and the rear end of the member 33 may have a suitable spacer positioned between the shim plates 38 on the bolt 36 to hold the same the desired distance apart in relation to the width of the spindle arm.

Thus it is apparent that my invention provides a trailer guide which is directly connected to the axles 28 of the steering wheels of the trailer. This construction permits the trailer guide to pull directly from the hub of the steering wheels, making an effective direct pull, with practically no lost motion, thereby guiding the steering wheels of the trailer in a very effective manner. In so far as I know this is an entirely new principle of guiding and pulling a trailer.

It is also a feature of my invention in providing a trailer guide and parts which are pivoted to swing up and down from the spindle arms so that the trailer guide may raise or lower readily and at the same time is pivotally connected with the cross members 10 and 11 and the pulling arms 19, together with the pivotal connection with the coupler 23 through the bolt 22. This permits the trailer guide to raise and lower to adjust itself in operation, yet holding the same firmly for guilding the steering wheels in the transverse movement of the same. The spindle arms of the steering wheels are rigidly connected to the axle and project forwardly in a manner to pivotally support the trailer guide. This, I believe, is a new principle, as it provides a means of steering direct from the arm which pulls directly from the axle of the steering wheels.

In accordance with the patent statutes I have described the principles of operation of my trailer guide which I have illustrated in a particular formation in the drawings, yet I desire to have it understood that the drawings are only illustrative of a means of carrying out my invention and that obviously the same may be applied to uses other than those above set forth and carried out by other means without departing from the spirit of my invention within the scope of the following claims.

I claim:

1. A trailer guide including a frame having parallelly extending transverse members, a tongue extending from said members, pulling arms connected to the ends of said members, and means for connecting said frame and pulling arms to the spindle arms of the steering wheels of a trailer to pivotally support said trailer guide to said spindle arms and to bear against the sides of said spindle arms in a manner to steer the wheels of a trailer.

2. A trailer guide and hitch including, spindle arms rigidly connected to the axles of the steering wheels of the trailer and adapted to project therefrom, and a guide and pulling frame connected to said arms in a manner to guide the wheels of the trailer and pull the trailer by said spindle arms.

3. A guide and hitch for a trailer including, steering wheel spindle arms, means connected to said spindle arms, said means including engaging members adapted to be pivotally secured to said spindle arms and engaging therewith to form a rigid connection between the trailer guide and said spindle arms.

4. A trailer guide including, a frame having members extending transversely and longitudinally, means for pivotally connecting said members together, steering wheel spindle arms adapted to be rigidly connected to the axle of the steering wheels, and means for pivotally connecting said frame to said spindle arms, said engaging means with said spindle arms extending back of the pivot point in a manner to engage the spindle arms to provide a connection between the spindle arms and said frame with practically no play.

5. A trailer guide including, a frame, parallelly extending front and back members, a tongue pivotally connected to said members adapted to extend therefrom, pulling arms connected to the outer ends of said members, said pulling arms including a pivotal connection with steering wheel spindle arms, and a bifurcated end adapted to engage on either side of the spindle arms beyond the pivotal connection therewith to guide a trailer with practically no lost motion between the connecting parts.

6. A hitch for a vehicle including, a tongue, a frame formed by an angle iron member extending across the rear of said tongue, a channel member and strap member extending in line and positioned ahead of said angle iron member, pulling arms adjustably connected between said channel member and strap member, coupler members pivotally connected to said angle iron member, a steering wheel spindle arm, bifurcated ends formed on said pulling arms whereby said bifurcated ends are adapted to adjustably engage the sides of said spindle.

7. A trailer guide including, a tongue, a frame guide pivotally connected with said tongue including parallelly spaced transverse members, pulling arms, means for adjustably connecting one end of said arms to one of said transverse members, means for pivotally connecting the other transverse member to said pulling arms, and means formed extending on said pulling arms adapted to engage the spindle arms of the steering wheels of a trailer between the ends thereof to guide and pull the trailer by the spindle arms of the same.

8. A trailer guide including, means adapted to pull and guide a trailer from the spindle arms extending rigidly from the axle of the steering wheels of the trailer.

9. A trailer guide including, spindle arms connected to the axle of the steering wheels of the trailer and means engaging said spindles to pull and guide the trailer.

10. A trailer guide including a pulling tongue, a frame pivotally connected to said tongue including pulling arms, bifurcated ends on said arms, couplers on said frame adapted to pivotally connect said guide to the free ends of the spindle arms of the steering wheels of a vehicle, and projecting guiding ends formed on said pulling arms adapted to engage the spindle arms in a manner to form a rigid guiding connection between said engaging ends and the pivotal connection with the free end of the spindle arms.

OSCAR BREKKE.